(12) United States Patent
Baroni et al.

(10) Patent No.: US 7,104,357 B2
(45) Date of Patent: Sep. 12, 2006

(54) DEVICE FOR GENERATING FOCUSED ELASTIC WAVES IN A MATERIAL MEDIUM SUCH AS UNDERGROUND, AND METHOD USING SAME

(75) Inventors: Axelle Baroni, Rueil Malmaison (FR); Patrick Meynier, Chatou (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 305 days.

(21) Appl. No.: 10/433,101

(22) PCT Filed: Dec. 19, 2001

(86) PCT No.: PCT/FR01/04059

§ 371 (c)(1),
(2), (4) Date: May 30, 2003

(87) PCT Pub. No.: WO02/50572

PCT Pub. Date: Jun. 27, 2002

(65) Prior Publication Data

US 2004/0032795 A1 Feb. 19, 2004

(30) Foreign Application Priority Data

Dec. 21, 2000 (FR) .................................. 00 16832

(51) Int. Cl.
*G01V 1/04* (2006.01)
*G01V 1/40* (2006.01)
*G01V 1/55* (2006.01)
*B06B 1/06* (2006.01)
*H04R 17/06* (2006.01)
*G01V 1/02* (2006.01)

(52) U.S. Cl. ...................... 181/121; 181/106; 181/104; 367/158; 367/162; 367/176; 367/37

(58) Field of Classification Search ................ 181/121, 181/113, 111, 108, 106, 104; 367/155–158, 367/162, 168, 176, 37
See application file for complete search history.

(56) References Cited

U.S. PATENT DOCUMENTS

| 2,688,124 A | | 8/1954 | Doty et al. | |
|---|---|---|---|---|
| 4,031,418 A | * | 6/1977 | Cluzel et al. | ............... 310/322 |
| 4,151,437 A | * | 4/1979 | Tocquet | ..................... 310/337 |
| 4,704,709 A | * | 11/1987 | Slebzak et al. | ............. 367/158 |
| 4,850,449 A | | 7/1989 | Cheung | |
| 4,996,674 A | | 2/1991 | Thompson | |

(Continued)

FOREIGN PATENT DOCUMENTS

EP        0 728 533 A1 * 8/1996

(Continued)

*Primary Examiner*—Edgardo San Martin
(74) *Attorney, Agent, or Firm*—Antonelli, Terry, Stout & Kraus, LLP

(57) ABSTRACT

An electromechanical device for generating elastic waves in a material medium such as the subsoil in a frequency range where the wavelengths of the waves generated are great in view of the dimensions of the device, and method of implementation. The device comprises one or more vibrators which are buried in the medium, associated with a control system. Each vibrator comprises at least one inertia mass (1), several plates (2, 3) providing mechanical coupling with the medium, electromechanical transducers (4, 5) connecting inertia masses (1) to plates (2, 3). A control system (7) applies to the various transducers (4, 5) respective control signals so that the resulting elastic wavefield generated in the medium by the device is preferentially oriented in one or more directions.

12 Claims, 2 Drawing Sheets

U.S. PATENT DOCUMENTS

| | | | |
|---|---|---|---|
| 5,005,665 A | * | 4/1991 | Cheung .................... 181/101 |
| 5,042,611 A | * | 8/1991 | Howlett ................... 181/104 |
| 5,070,486 A | * | 12/1991 | Boucher .................. 367/155 |
| 5,130,953 A | * | 7/1992 | Grosso .................... 367/155 |
| 5,363,345 A | * | 11/1994 | Boucher et al. ........... 367/162 |
| 5,483,502 A | * | 1/1996 | Scarpitta et al. .......... 367/158 |
| 5,579,287 A | * | 11/1996 | Boucher et al. ........... 367/167 |
| 5,636,183 A | * | 6/1997 | Boucher et al. ........... 367/173 |
| 5,694,374 A | * | 12/1997 | Ripoll et al. .............. 367/162 |

FOREIGN PATENT DOCUMENTS

| | | |
|---|---|---|
| FR | 2589587 | 7/1987 |
| FR | 2720588 | 12/1995 |
| FR | 2791780 | 10/2000 |
| GB | 1513530 | 6/1978 |
| WO | WO 98/13707 | 4/1998 |

* cited by examiner

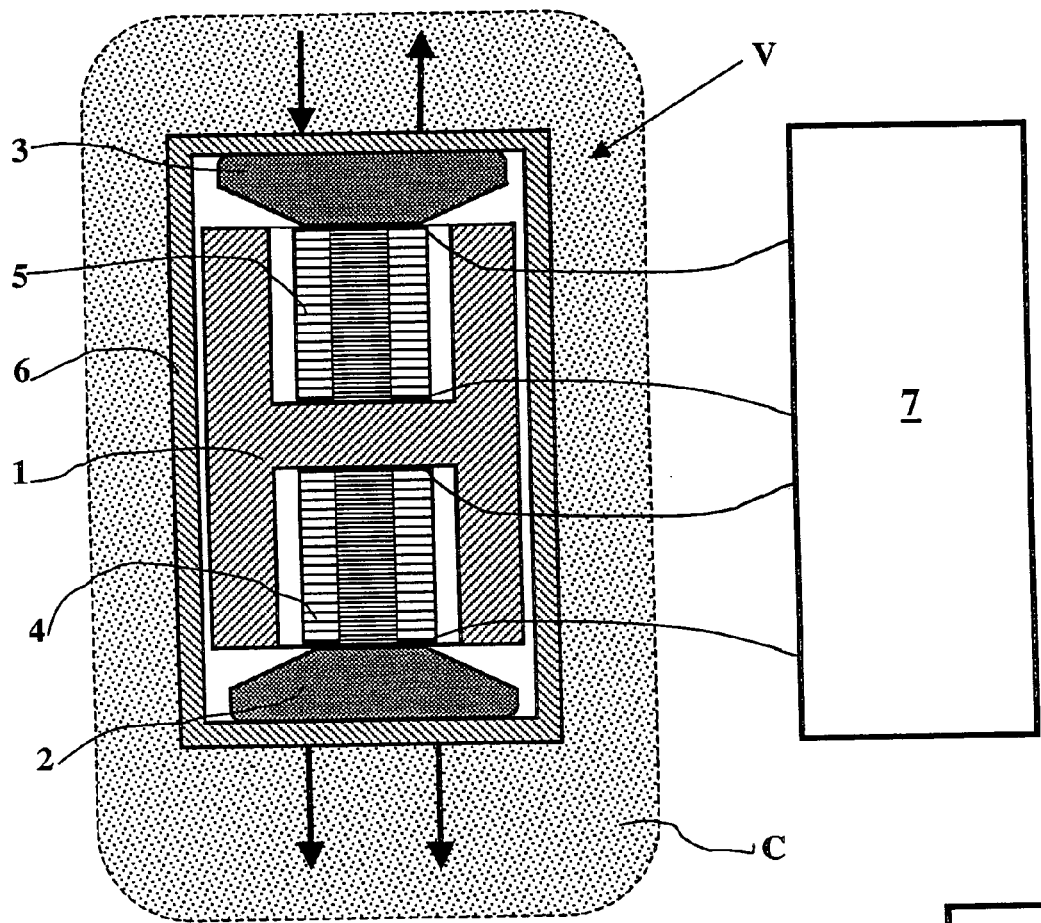
FIG.1
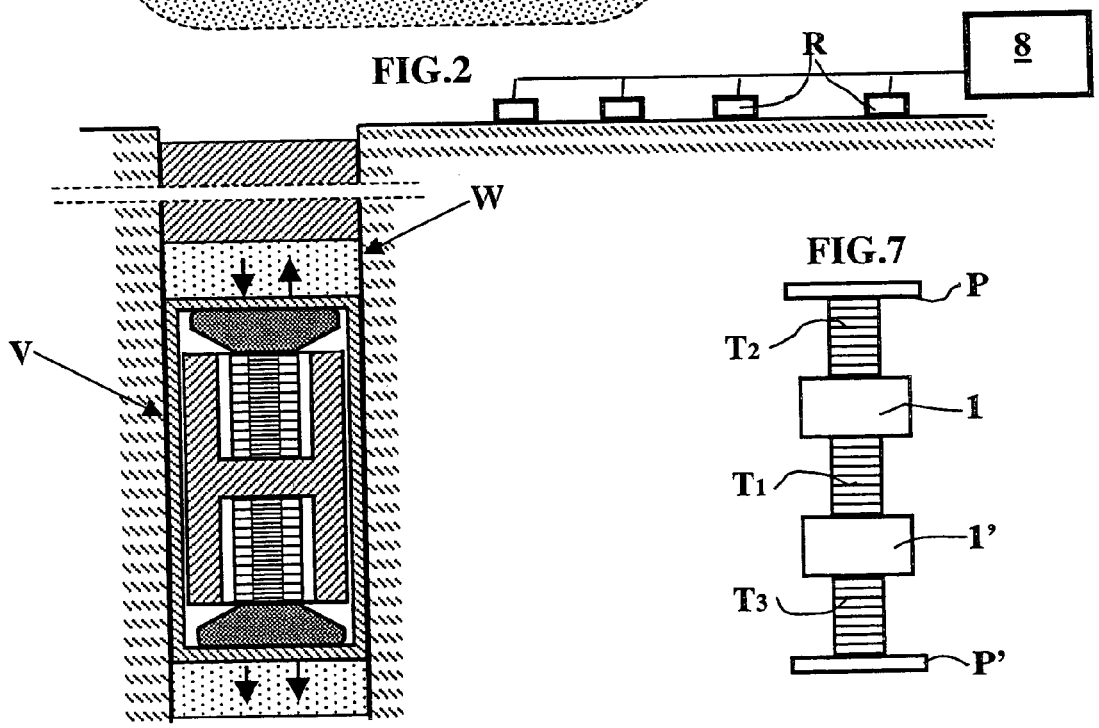
FIG.2
FIG.7

DEVICE FOR GENERATING FOCUSED ELASTIC WAVES IN A MATERIAL MEDIUM SUCH AS UNDERGROUND, AND METHOD USING SAME

FIELD OF THE INVENTION

The present invention relates to a focused-emission electromechanical device for generating vibrations in a material medium such as the subsoil and to a method for implementing it.

Such a device finds applications notably within the scope of seismic exploration or seismic monitoring of an underground formation such as a hydrocarbon reservoir.

BACKGROUND OF THE INVENTION

The object of seismic prospecting operations is to record seismograms of the formation to be explored from elastic waves picked up by suitable receivers coupled with the formation (arranged at the surface or in wells), these waves being reflected by the subsoil discontinuities in response to waves emitted by an elastic wave source of any type, either an impulsive source: explosive charge in a hole, air guns towed by a ship at sea, etc., or vibrators emitting signals of variable length, generally variable-frequency signals. The frequency variation can be continuous within a certain frequency range (sweep) as described in patent U.S. Pat. No. 2,688,124 or discontinuous with binary coding as described in patent FR-2,589,587.

The vibrators can be, for example, of electromagnetic or electrohydraulic type, or piezoelectric. A piezoelectric type vibrator comprises for example a plate intended to provide coupling with the ground, a sufficiently heavy inertia mass coupled with the plate by means of one or more piezoelectric transducers. Each transducer comprises for example a pile of piezoelectric ceramic elements coupled in parallel, and it is connected to a vibrational signal generator. A piezoelectric vibrator is described for example in patent FR-2,791,780 filed by the applicant.

The seismic sources coupled with the ground surface are directional but the seismic energy they can emit depends very much on the coupling quality, which itself depends on the local climatic variations. This is a drawback notably when long-term monitoring operations are carried out in a reservoir under development so as to be able to compare, at intervals of several months for example, the seismograms obtained successively, and thus to detect variations in the state thereof. It is therefore preferable, when a certain emission reproducibility is desired, to couple the sources with the formation, below the weathered zone. A well of sufficient depth to reach the base of the weathered zone is therefore bored, the source is installed at the bottom thereof and connected to a suitable power generator.

However, the drawback of this coupling mode is that the source is no longer directional and emits upwards. The radiation that crosses the weathered zone disturbs the seismograms obtained.

A directional source is described, for an acoustic application, in patent U.S. Pat. No. 4,996,674. It is a high-frequency Janus type immersed source comprising a mass fastened between two piezoelectric transducers. A plate is fastened to the end of each transducer opposite the central mass. The mechanical impedance put up by the immersion medium is identical for each plate. The two transducers are fed independently of one another so that the motion of one or the other plate is inhibited. In the relatively high acoustic frequencies range, since the wavelengths of the waves emitted are short in view of the dimensions of the source, the waves are emitted only towards the outside of the mobile plate and practically not on the opposite side. In the very low frequencies range in which seismic sources operate, inhibition of the speed of one of the plates does not make the source directional because the mobile plate generates a back wave in phase opposition.

SUMMARY OF THE INVENTION

The device according to the invention allows to generate, in a material medium, a focused vibrational wavefield (obtained in one or two successive phases with two distinct wavefields, non-focused but complementary insofar as their sum results in a focused field), in a frequency range where the wavelengths of the waves generated are great in view of the dimensions of the device. It comprises at least one vibrator suited to be buried in the medium, including at least one inertia mass, at least two plates mechanically coupled with the medium (the mechanical impedance of this medium is not necessarily uniform so that the two plates can undergo different impedances), electromechanical transducers connecting each inertia mass to the plates and a control system suited to apply to the electromechanical transducers respective control signals so that the resulting wavefield generated in the medium by the device is focused in a privileged direction.

According to an embodiment, each vibrator comprises a single inertia mass, at least two plates coupled with the medium and electromechanical transducers tightly fastened on the one hand to the inertia mass and to the plates respectively, two of said plates having a common spatial orientation, the control system being suited to apply thereto different control signals so selected that the combination of the stresses applied to the medium is mainly oriented in a predetermined direction.

According to another embodiment, each vibrator comprises a single inertia mass, at least one pair of plates coupled with the medium and at least one pair of electromechanical transducers tightly fastened on the one hand to the inertia mass and to the plates of said pair of plates respectively, the two plates of each pair have a common spatial orientation and are arranged on either side of the inertia mass, the two electromechanical transducers of each pair being arranged in line along the same axis.

According to another embodiment, each vibrator comprises at least two pairs of plates associated with the inertia mass by means of at least two pairs of transducers, the respective axes of the various pairs of transducers being oriented in different directions.

The control system comprises means for applying to a first transducer of said pair of transducers a combined control signal obtained by summing a first signal ($U_D$) and a second signal ($U_F$) selected as a function of first signal ($U_D$), and for applying to the second transducer of said pair of transducers a second combined control signal obtained by summing a first signal $f_D(U_D)$ and a second signal $f_F(U_F)$ so as to neutralize the radiation of the plate associated with the second transducer. Functions $f_D$ and $f_F$ will be detailed hereafter.

Second signal $U_F$ is expressed as a function of first signal $U_D$ for example by the relation:

$$U_F = U_D \times \frac{2\pi}{\lambda}.$$

According to another embodiment, the device comprises several vibrators including each at least one inertia mass, at least two plates mechanically coupled with the medium, electromechanical transducers tightly connecting the inertia mass to the plates and a control system suited to apply to the electromechanical transducers of the vibrators respective control signals such that the global wavefield produced by the device is oriented in a predetermined spatial direction.

The device comprises for example means (a cement mass or equivalent, or an element made of an elastic material in contact with at least one of the plates for example) for modifying the coupling coefficient of the various plates with the medium, so as to reinforce the polarization of the waves applied to the medium by the device.

According to another embodiment, at least one inertia mass consists of a volume of said medium or of a volume of a solid material.

The method of prospecting a material medium such as the subsoil according to the invention comprises forming seismograms of the formation to be explored from elastic waves picked up by suitable wave receivers coupled with the formation, these waves being reflected by the discontinuities of the medium in response to elastic waves emitted. It comprises using as a source of elastic waves a device including at least one vibrator suited to be buried in the medium, comprising at least one inertia mass, at least two plates mechanically coupled with the medium, electromechanical transducers connecting each inertia mass to the plates and a transducer control system, and applying to the transducers control signals of selected amplitude and phase so that the resulting wavefield applied to the medium is focused in a given direction.

According to an implementation mode where each vibrator comprises a single inertia mass, connected to at least one pair of plates by at least one pair of electromechanical transducers, the two plates of each pair being arranged on either side of the inertia mass and having a common spatial orientation, and the two electromechanical transducers of each pair being arranged in line along the same axis, the resulting wavefield is generated:

by applying during a first stage respectively to the electromechanical transducers respectively two vibrational signals in phase opposition ($U_F$) and $f_F(-U_F)$ so as to form a first seismogram of the medium, by applying during a second stage respectively to the two electromechanical transducers respectively two vibrational signals in phase ($U_D$) and $f_D(U_D)$, with ($U_D$) selected as a function of the first vibrational signal ($U_F$), so as to form a second seismogram of the medium, and by summing the seismograms formed during the first and the second stage, the seismogram obtained by summation resulting in a wavefield, corresponding to a focused emission of elastic signals.

According to an implementation mode with a device comprising a single inertia mass, connected to at least one pair of plates by at least one pair of electromechanical transducers, the two plates of each pair being arranged parallel to one another and on either side of the inertia mass, and the two electromechanical transducers of each pair being arranged in line along the same axis, the resulting wavefield is generated by applying to one of the electromechanical transducers a vibrational signal that is equal to the sum of a first vibrational signal ($U_D$) and of a second vibrational signal ($U_F$) selected as a function of first vibrational signal ($U_D$), and by applying to the other electromechanical transducer a second combined control signal obtained by summing a first signal $f_D(U_D)$ and a second signal $f_F(U_F)$ so as to neutralize the radiation of the plate associated with the second electromechanical transducer.

Vibrational signal ($U_F$) is connected to vibrational signal ($U_D$) for example by the relation:

$$U_F = U_D \times \frac{2\pi}{\lambda}.$$

According to another implementation mode, the resulting wavefield is generated by making the plates or the coupling mode of the plates with the medium unsymmetrical.

According to another implementation mode, at least a first plate is brought into contact with a cement mass or equivalent, and at least a second plate is brought into contact directly with the medium.

The device according to the invention thus allows to bury deep down one or more vibrators emitting, in a frequency range where the wavelengths of the waves generated are great in view of the dimensions of the device, a focused wavefield.

BRIEF DESCRIPTION OF THE DRAWINGS

Other features and advantages of the device according to the invention and of the method for implementing it will be clear from reading the description hereafter, with reference to the accompanying drawings wherein:

FIG. 1 diagrammatically shows the layout of the vibrator with its associated control device, FIG. 2 is a diagrammatic example of setting in the field of an onshore seismic system using the vibrator of FIG. 1, FIGS. 3A, 3B, 3C show the respective emission lobes of the two transducers of the vibrator, in a two-stage seismic acquisition procedure (FIGS. 3A, 3B) allowing to obtain, by trace stacking, a highly directional resulting wavefield (FIG. 3C), FIG. 4 diagrammatically shows an embodiment where each vibrator comprises several electromagnetic transducers with different spatial orientations, FIG. 5 diagrammatically shows another embodiment where each vibrator comprises several pairs of electromagnetic transducers oriented each in a different direction, FIG. 6 diagrammatically shows another embodiment where the device comprises several vibrators buried close to one another, suited to emit focused waves in different directions, FIG. 7 diagrammatically shows another embodiment where the device comprises one or more vibrators comprising two inertia masses and three electromechanical transducers, and FIG. 8 diagrammatically shows the dynamic components of the device of FIG. 1 for example.

DETAILED DESCRIPTION

Figure 3A:

According to the embodiment of FIG. 1, the device comprises at least one focused vibrator V essentially including a sufficiently heavy inertia mass 1, two plates 2, 3 arranged parallel to one another and on either side of the inertia mass, two electromechanical transducers 4, 5 of any type (piezoelectric, magnetostrictive, hydraulic, etc.), in line along the same axis, connecting inertia mass 1 respectively to the two plates 2, 3 and an elastic sheath 6 intended to externally insulate vibrator V.

Vibrator V is arranged (FIG. 2) in a cavity provided in the medium, in a consolidated zone, either directly or embedded in a mass of cement poured in the cavity around it. A control system 7 is suited to apply to the two transducers respective forces such that the resulting wavefield generated in the medium is unsymmetrical. Wave receivers R coupled with the medium and an acquisition and recording system 8 suited to form seismic seismograms of the medium from the signals picked up by the receivers in response to the wavefields emitted are associated with vibrator V.

The signals to be applied to each vibrator in order to obtain a focused emission in a given direction are calculated as follows.

An acoustic impedance value is first fixed for each plate and the forces generated on each one are calculated. The vibrator is therefore modelled using the transfer matrix technique described for example by Decarpigny J. N. et al in J. Acoust. Soc. Am., 78 (5) November 1985, pp. 1499–1507.

The amplitude ratios required for the forces generated so that, after combination, certain emission directions are privileged are calculated thereafter. The theoretical radiation diagrams of point sources of force or dipole type, in spaces or half spaces, can be used therefore, or these radiations can be calculated by means of specialized numerical computing softwares well-known to the man skilled in the art.

Figure 8:
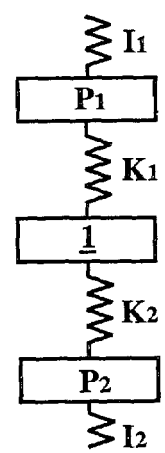

In order to illustrate the method of calculating the control signals that lead to inhibiting the radiation on one side of the device, we consider the general case of a pair of transducers (FIG. 8) where neither the device nor the impedances undergone by the two plates are symmetrical. M is the mass of inertia mass 1, $M_1$ and $M_2$ are the respective masses of plates P1 and P2, $K_1$ and $K_2$ are the stiffness of transducers 4, 5 respectively associated with plates P1 and P2, $Z_1$ and $Z_2$ are the impedances of the ground undergone by plates P1 and P2 respectively, $r_1$ and $r_2$ are the electrodynamic coupling coefficients connecting the voltage to the dynamic force, and $U_1(t)$ and $U_2(t)$, referred to as $U_1$ and $U_2$ hereafter, are the time-variable supply voltages of transducers 4 and 5 (positive voltages if they imply an elongation of the pillar, by convention).

The dynamic forces $F_1$ and $F_2$ developed by plates P1 and P2 in the surrounding medium meet (by orienting them in the same direction):

$$F_1 = k_{11}U_1 + k_{12}U_2,$$

$$F_2 = k_{21}U_1 + k_{22}U_2, \text{ avec}$$

$$k_{11} = \frac{Z_1 r_1}{D}\{Z_2 K_2 - \omega^2[M(Z_2 + K_2) + K_2 M_2] + \omega^4 M_2 M\},$$

$$k_{22} = -\frac{Z_2 r_2}{D}\{Z_1 K_1 - \omega^2[M(Z_1 + K_1) + K_1 M_1] + \omega^4 M_1 M\},$$

$$k_{12} = \frac{Z_1 r_2}{D}\{Z_2 K_1 - \omega^2 K_1 M_2\},$$

$$k_{21} = -\frac{Z_2 r_1}{D}\{Z_1 K_2 - \omega^2 K_2 M_1\},$$

$$D = Z_1 Z_2 (K_1 + K_2) + K_1 K_2 (Z_1 + Z_2) -$$
$$\omega^2[K_1 K_2(M + M_1 + M_2) + (K_1 + K_2)(M_2 Z_1 + M_1 Z_2) + M(Z_1 Z_2 + Z_1 K_2 + Z_2 K_1)] +$$
$$\omega^4[MM_1(Z_2 + K_2) + MM_2(Z_1 + K_1) + M_1 M_2(Z_1 + K_1) + M_1 M_2(K_1 + K_2)] - \omega^6 M_1 M_2 M.$$

For the device to act as a simple force on the medium, we must have $F_1 = F_2$; which implies the following value for supply voltage $U_2$:

$$U_2 = f_F(U_1) = -U_1 \times \frac{r_1}{r_2}\left[\frac{2K_2 Z_1 Z_2 - \omega^2(Z_1 Z_2 M + Z_1 K_2 M + Z_1 K_2 M_2 + Z_2 K_2 M_1) + \omega^4 Z_1 M_2 M}{2K_1 Z_1 Z_2 - \omega^2(Z_1 Z_2 M + Z_2 K_1 M + Z_2 K_1 M_1 + Z_1 K_1 M_2) + \omega^4 Z_2 M_1 M}\right].$$

For the device to act as a dipole, we must have $F_1 = F_2$; which implies the following value for supply voltage $U_2$:

$$U_2 = f_D(U_1) = U_1 \times \frac{r_1}{r_2}\left[\frac{Z_2 K_2 M_1 - Z_1 Z_2 M - Z_1 K_2 M - Z_1 K_2 M_2 + \omega^2 Z_1 M_2 M}{Z_1 K_1 M_2 - Z_2 Z_1 M - Z_2 K_1 M - Z_2 K_1 M_1 + \omega^2 2 M_1 M}\right].$$

For the combination of the two emissions to be minimized on one side of the device, we must have $$(F_1)_{force} = (F_1)_{dipole} \times \frac{2\pi}{\lambda}$$

where $\lambda$ is the wavelength of the waves generated; this relation allows to select $(U_1)_{force}$ as a function of $(U_1)_{dipole}$, hereafter referred to as $U_F$ and $U_D$ respectively, with:

$$U_F = U_D \times \frac{2\pi}{\lambda} \qquad (1)$$

for the radiations of the dipole and the force to be inhibited on one side.

Figure 3B:
Figure 3C:

According to a first implementation mode, the resulting wavefield is obtained in two stages. During a first stage, two sinusoidal signals $U_F(t)$ and $f_F(U_F(t))$ (FIG. 3A) in phase opposition are respectively applied to the two transducers 4, 5. Vibrator V generates a first wavefield along the common axis of the two transducers 4, 5 and acquisition of the seismic signals reflected by the medium is performed so as to form a first seismogram of the medium. Then, during a second stage, two sinusoidal signals $U_D(t)$ and $f_D(U_D(t))$ (FIG. 3B) in phase are applied to the two transducers and acquisition of the seismic signals reflected by the medium is performed in the same way so as to form a second seismogram of the medium. Signals $U_F(t)$ and $U_D(t)$ are properly adjusted in accordance with Relation 1 above so that summation of the seismograms formed during the first and the second stage allows to obtain an equivalent seismic seismogram corresponding to a focused elastic wavefield as shown in FIG. 3C.

According to a second implementation mode, a similar result is obtained by applying to one of the transducers 4 a signal equal to the sum of the previous signals $U_F(t)$ and $U_D(t)$, and to the opposite transducer 5 a signal equal to $f_D(U_D(t))+f_F(U_F(t))$. This has the effect of neutralizing from a distance the <<back>> radiation, the device being thus made focused.

Figure 4:
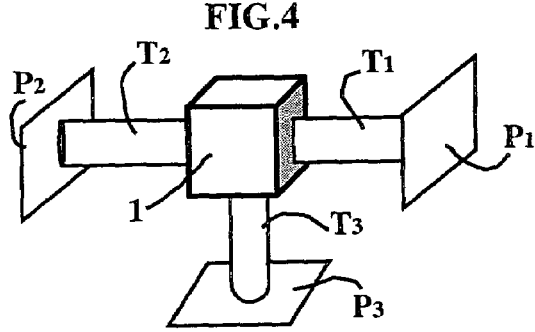

The relative amplitudes of the control signals in relation to one another generally depend on the wavelength and they have to be adjusted accordingly, in cases where the emitted frequencies are modified (emission of sliding frequencies for example). According to the embodiment of FIG. 4, each vibrator V comprises an inertia mass 1 and at least three electromagnetic transducers T1, T2, T3. Two of them, T1, T2, whose axes are oriented in a common direction, connect two plates P1, P2 to the inertia mass. The third transducer T3 connecting a third plate P3 to inertia mass 1 is oriented in a different direction to the other two. Control system 7 is common to all the transducers T1–T3 and it applies thereto control signals selected to obtain a focused emission in a certain direction.

Figure 5:
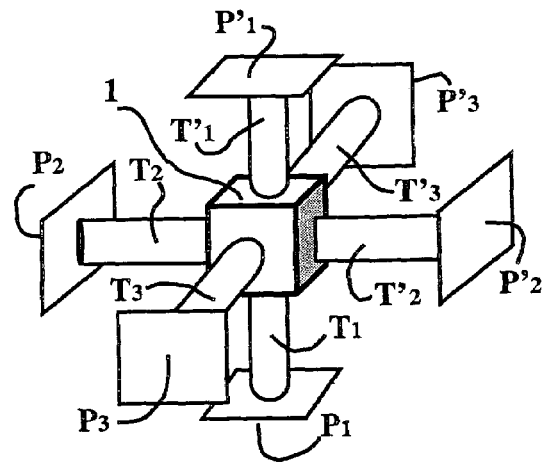

Calculation of the suitable amplitudes for this embodiment is carried out by applying the calculation method described above, applied to oscillating system T1–T3. According to the embodiment of FIG. 5, each vibrator V comprises a common inertia mass 1 and several (three in the present example) pairs of transducers (T1, T'1), (T2, T'2), (T3, T'3) connecting each two plates (P1, P'1) or (P2, P'2) or (P3, P'3) to common inertia mass 1. The transducers of each pair are oriented in a common direction, different from that of the other pairs. The directions of the three pairs are for example oriented along the edges of a trirectangular trihedron. The control system is also common to all the pairs of transducers and applies thereto control signals selected to obtain a focused emission in a certain direction. The amplitude of the control signals suitable for this other embodiment is calculated similarly as described above. This embodiment provides a particularly great latitude of spatial orientation of the focused emissions.

Figure 6:
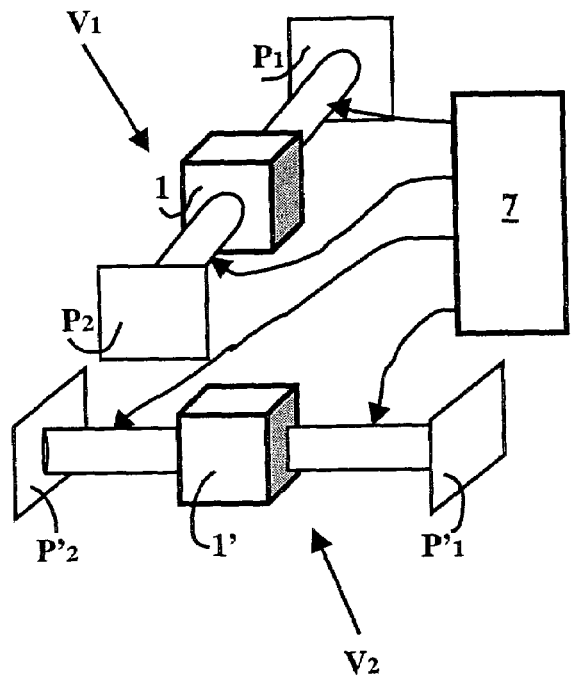

According to the embodiment of FIG. 6, the device comprises n vibrators V1–Vn (n≧2) buried in the ground, close to one another, comprising each an inertia mass 1, 1' and two (or more) electromagnetic transducers (T1, T'1) and (T2, T'2) connecting each a plate (P1, P'1) and (P2, P'2) to one of the inertia masses 1, 1'. The axes of two transducers of each vibrator V1, V2 are oriented in a common direction, different from that of the transducers of the other vibrator. The device comprises a control system 7 common to the two vibrators V1, V2 and suited to apply thereto signals so as to obtain a combined wavefield whose orientation and global shape depend on the amplitudes and on the phases of the signals respectively applied to the vibrators. By using for example three vibrators whose axes are oriented along the axes of a trihedron, it is possible, by exploiting the amplitudes and the phases, to orient the wavefield produced as a function of the subsoil zone to be explored.

According to the embodiment of FIG. 7, each vibrator comprises at least two inertia masses 1, 1' connected together by an electromechanical transducer T1, each mass 1, 1' being mechanically connected by an electromechanical transducer T2, T3 to a plate P, P'.

It is also possible to obtain a resulting wavefield favouring an emission direction in relation to the opposite direction by making the coupling mode of the two plates with the medium unequal. For example, one of the plates (plate 2 for example) can be brought into contact with a mass of cement or equivalent, and the opposite plate (3 for example) is brought into contact directly with the medium. It is also possible to interpose, between one of the plates and the medium a layer of a material having a different acoustic quality: an elastomer layer for example.

Another means consists in using transducers 4, 5 with different characteristics.

According to a preferred embodiment, the transducers are of piezoelectric type. They comprise each a pillar consisting, as it is well-known in the art, of a pile of piezoelectric sensitive elements electrically connected in parallel. In this case, the transducers can be made different by modifying the number of piezoelectric elements that constitute the piles, or by using elements of different shapes or sizes as regards the surface area and/or the thickness thereof.

The inertia mass can be made of any material: metal, cement or equivalent, or even a volume of the medium in which the device is buried, interposed between the transducers.

The invention claimed is:

1. A method of prospecting a material medium comprising:

forming seismograms of a formation to be explored of the material medium from elastic waves emitted by an emission source in a frequency range where wavelengths of the elastic waves relate to dimensions of the source, wherein the source of the elastic waves is a device comprising at least one vibrator for burying in the material medium, including each a single inertia mass being connected by at least one pair of electromechanical transducers to at least one pair of plates mechanically coupled with the material medium, the two plates of each pair being arranged on either side of the single inertia mass and having a common spatial orientation, and the two electromechanical transducers of each pair being arranged in line along the axis, and a control system for applying control signals to the electromechanical transducers; and wherein a resulting wavefield is directly generated by applying to one of the electromechanical transducers a vibrational signal equal to a sum of a first vibrational signal $U_F(f)$ and of a second vibrational signal $U_D t$, and by applying to another electromechanical transducer a second combined control signal obtained by summing of a signal $-U_F(t)$ and the signal $U_D(t)$ so as to neutralize radiation of a plate associated with another electromechanical transducer.

2. A method as claimed in claim 1, wherein:
the second vibrational signal $U_D(t)$ relates to the first vibrational signal $U_F(t)$ by the relation:

$$U_F(t) = U_D(t) \times \frac{2\pi}{\lambda},$$

where $\lambda$ is the wavelength of the emitted elastic waves.

3. A method as claimed in claim 1, wherein:
a wavefield is generated by making the at least a pair of plates or a coupling mode of the at least pair of plates unsymmetrical relative to the material medium.

4. A method as claimed in claim 2, wherein:
a wavefield is generated by making the at least a pair of plates or a coupling mode of the at least pair of plates unsymmetrical relative to the material medium.

5. A method as claimed in claim 2, wherein:
at least a first plate is brought into contact with a mass of solidified solid and at least a second plate is directly brought into contact with the material medium.

6. A method as claimed in claim 2, wherein:
at least a first plate is brought into contact with a mass of solidified solid and at least a second plate is directly brought into contact with the material medium.

7. A method of prospecting a material medium comprising:
forming seismograms of a formation to be explored of the material medium from elastic waves emitted by an emission source in a frequency range where wavelengths of the elastic waves relate to dimensions of the source, wherein the source of the elastic waves is a device comprising at least one vibrator for burying in the material medium, including each a single inertia mass being connected by at least one pair of electromechanical transducers to at least one pair of plates mechanically coupled with the material medium, the two plates of each pair being arranged on either side of the single inertia mass and having a common spatial orientation, and the two electromechanical transducers of each pair being arranged in line along the axis, and a control system for applying control signals to the electromechanical transducers; and wherein a first seismogram of the medium is generated by applying during a first stage respectively to the electromechanical transducers two vibrational signals in phase opposition, $U_F(t)$ and $f_F(U_D(t))$;

a second seismogram of the medium is generated by applying during a second stage respectively to the electromechanical transducers two vibrational signals in phase, $U_D(t)$ and $f_D(u_D(t))$, with $U_D(t)$ being selected as a function of a first vibrational signal $U_F(t)$, and a third seismogram of the medium is generated by summing the first and second seismograms, the third seismogram resulting in a wavefield corresponding to a focused emission of elastic signals.

8. A method as claimed in claim 7, wherein:
the second vibrational signal $U_D(t)$ relates to the first vibrational signal $U_F(t)$ by the relation:

$$U_F(t) = U_D(t) \times \frac{2\pi}{\lambda},$$

where $\lambda$ is the wavelength of the emitted elastic waves.

9. A method as claimed in claim 7, wherein:
a wavefield is generated by making the at least a pair of plates or a coupling mode of the at least pair of plates unsymmetrical relative to the material medium.

10. A method as claimed in claim 8, wherein:
a wavefield is generated by making the at least a pair of plates or a coupling mode of the at least pair of plates unsymmetrical relative to the material medium.

11. A method as claimed in claim 7, wherein:
at least a first plate is brought into contact with a mass of solidified solid and at least a second plate is directly brought into contact with the material medium.

12. A method as claimed in claim 8, wherein:
at least a first plate is brought into contact with a mass of solidified solid and at least a second plate is directly brought into contact with the material medium.

* * * * *